US009964259B2

United States Patent
Hudson (10) Patent No.: US 9,964,259 B2
(45) Date of Patent: May 8, 2018

(54) COLLAPSIBLE LED FIXTURE (71) Applicant: Timothy John Hudson, El Segundo, CA (US)

(72) Inventor: Timothy John Hudson, El Segundo, CA (US)

(73) Assignee: HUDSON SPIDER LLC, Valencia, CA (US)

( * ) Notice: Subject to any disclaimer, the term of this patent is extended or adjusted under 35 U.S.C. 154(b) by 0 days. days.

(21) Appl. No.: 14/620,091

(22) Filed: Feb. 11, 2015

(65) Prior Publication Data

US 2016/0230942 A1 Aug. 11, 2016

(51) Int. Cl.
G03B 15/02 (2006.01)
F21K 99/00 (2016.01)
G03B 15/05 (2006.01)
F21Y 101/02 (2006.01)

(52) U.S. Cl.
CPC .......... F21K 9/30 (2013.01); F21K 9/50 (2013.01); G03B 15/02 (2013.01); G03B 15/05 (2013.01); F21Y 2101/02 (2013.01); G03B 2215/0517 (2013.01); G03B 2215/0553 (2013.01); G03B 2215/0567 (2013.01)

(58) Field of Classification Search
CPC .......... G03B 15/0415; G03B 15/0442; G03B 15/02; G03B 15/05; F21K 9/30; F21K 9/50
USPC .......................................................... 362/11
See application file for complete search history.

(56) References Cited

U.S. PATENT DOCUMENTS

| 2,806,134 A * | 9/1957 | Tarcici | F21V 7/18 |
| | | | 126/680 |
| 3,825,024 A * | 7/1974 | Cohen | A45B 19/00 |
| | | | 135/15.1 |
| 3,851,164 A | 11/1974 | Intrator | |
| 4,633,374 A | 12/1986 | Waltz et al. | |
| 5,023,757 A * | 6/1991 | Shirilla | G03B 15/06 |
| | | | 362/16 |
| 5,463,536 A * | 10/1995 | Chou | A45B 3/02 |
| | | | 362/102 |

(Continued)

FOREIGN PATENT DOCUMENTS

| CN | 202750864 U | 2/2013 |
| GB | 2408316 A | 5/2005 |

OTHER PUBLICATIONS

Adafruit, Florabrella, https://blog.adafruit.com/2014/04/23/florabrella-led-umbrella-with-neopixels-wearablewednesday/, Apr. 23, 2014.*

(Continued)

Primary Examiner — Bryon T Gyllstrom
(74) Attorney, Agent, or Firm — Mark E. Ungerman; Ungerman IP PLLC (57) ABSTRACT According to the invention, an LED fixture is provided for photographic and theatrical lighting. The light fixture is particularly suitable for photographic and theatrical lighting by mounting LED elements directly or indirectly on articulating arms. The arms rotate 90 degrees from a position where the arms are aligned substantially in parallel with an axis of the fixture hub and may be rotated 90 degrees for deployment of the fixture. In addition, the spokes may be flexed beyond the alignment permitted by the cooperation between the hub and mounting elements.

20 Claims, 9 Drawing Sheets

(56) References Cited

U.S. PATENT DOCUMENTS

| | | | |
|---|---|---|---|
| 6,491,405 B1 * | 12/2002 | Shirilla | G03B 15/06 362/16 |
| 6,604,844 B2 | 8/2003 | Hussey | |
| 6,948,823 B2 | 9/2005 | Pohlert et al. | |
| 7,131,753 B1 * | 11/2006 | Edwards, Jr. | F21S 2/005 362/11 |
| 7,318,652 B2 | 1/2008 | Pohlert et al. | |
| 7,438,454 B2 | 10/2008 | Chinniah et al. | |
| 7,874,692 B2 * | 1/2011 | Zheng | F21K 9/00 135/16 |
| 7,972,022 B2 | 7/2011 | Pohlert et al. | |
| 8,540,383 B2 | 9/2013 | Pohlert et al. | |
| 2004/0052076 A1 * | 3/2004 | Mueller | F21V 23/0442 362/293 |
| 2004/0100791 A1 | 5/2004 | Bilotti et al. | |
| 2006/0005868 A1 * | 1/2006 | Fenton | A45B 9/02 135/16 |
| 2006/0022614 A1 | 2/2006 | Young | |
| 2006/0070642 A1 * | 4/2006 | Lo | A45B 3/04 135/16 |
| 2009/0090404 A1 * | 4/2009 | Kuelbs | A45B 3/00 135/16 |
| 2011/0063858 A1 | 3/2011 | Ortiz-Gavin | |
| 2013/0120960 A1 | 5/2013 | Harooni | |
| 2013/0242546 A1 * | 9/2013 | Sainz | F21L 4/02 362/183 |
| 2014/0071697 A1 | 3/2014 | Portmann et al. | |
| 2014/0192510 A1 | 7/2014 | Kim | |

OTHER PUBLICATIONS

Sockmaster, Electric Umbrella, https://web.archive.org/web/20101208062802/http:/www.instructables.com/id/Electric-Umbrella/?#step1, Feb. 18, 2009.*

Philips Lumileds Lighting Co., Luxeon Rebel General Purpose White Portfolio LEDs Technical Datasheet DS64, 2014, pp. 1-26, USA.

Litegear, Inc., Litegear LED Literibbon—VHO 120, VHO 60, VHO 30, Hybrid White, Adjustable Kelvin Temperature Product Description, undated, pp. 1-2, Sun Valley, CA, USA.

Louis L. Bachiarelli, Jr., Engineering Mechanics for Structures, 2002, Chapter 8, pp. 1-36, USA.

International Search Report and Written Opinion—PCT/US2016/17398—ISA/US—Apr. 22, 2016.

* cited by examiner

COLLAPSIBLE LED FIXTURE

BACKGROUND OF THE INVENTION

1. Field of the Invention

The invention relates to lighting fixtures, and particularly to fixtures for use in still photography and cinematography.

2. Description of the Related Technology

Photography is the science, art, and practice of creating durable images by recording light or other electromagnetic radiation, either electronically, by means of an image sensor, or chemically, by means of a light-sensitive material such as photographic film. Still photography is the practice of making non-moving photographs, as distinct from motion picture photography (cinematography). Cinematography is the science or art of motion picture photography by recording light or other electromagnetic radiation, either electronically by means of an image sensor, or chemically, by means of a light-sensitive material such as film stock. Photographic lighting is the illumination of scenes to be photographed. A photograph may simply record patterns of light, color, and shade; lighting is important in controlling the image. In many cases even illumination is desired to give an accurate rendition of the scene. In other cases the direction, brightness, and color of light are manipulated for effect. Lighting is particularly important for establishing an interplay of highlights and shadows. Lighting and exposure are used to create effects such as low-key and high-key.

The main sources of light for photography are:

1. Natural/daylight, which varies with the weather and the time of day. Different techniques are necessary to take best advantage of or control the impact of natural light conditions, such as brilliant sunshine, an overcast evening, or any other condition;
2. Continuous artificial light, which may be normal lighting, or produced by special photoflood lights or other fixtures; and
3. A bright and very brief photographic flash from one or more positions.

The properties of different light sources vary; household incandescent lighting, fluorescent lighting, sodium discharge street lighting, etc., are very different and produce different results, and require different correction if a subjectively neutral or other desired rendition of colors is required.

Lighting creates the two dimensional pattern of contrast the brain interprets to recognize three dimensional objects in photographs. In an in-person viewing experience the brain relies on stereoscopic vision, parallax, shifting focal in addition to the clues created by the highlight and shadow patterns the light on the object creates. When viewing a photographic image the brain tries to match the patterns of contrast and color it seen to those other sensory memories.

The baseline for what seems "normal" in lighting is the direction and character of natural and artificial sources and the context provided by other clues. In the example the photographer added a warming gel on the flash of the woman standing in a field in late afternoon light. The viewer knows the time of day from the angle of the shadows and neutral color balance would have seemed odd in that context. But similarly the image of the woman if masked out and put on a plain white or neutral gray background would seem abnormally yellow.

The goal in all photographs is not necessarily to create an impression of normality. A lighting strategy can be used to achieve an impression that is different than normally expected. Light direction relative to the camera can alter the appearance of a three dimensional object to give a two-dimensional impression. The presence, position, size/length, and direction of highlights and shadows provide other clues to shape and, when outdoors, the time of day. The tone and length of shadows provide contextual clues about the time of day or environment and by inference, based on personal experience, the mood of person.

A skilled photographer can manipulate how a viewer is likely to react to the content of a still or moving photograph by manipulating the lighting. In outdoor photography that can require a change in location, waiting for the ideal time (angle of sunlight) of day or in some cases the ideal time of year for the lighting to create the desired impression in the photograph or manipulating the natural lighting by using reflectors or flash. One of the limits to options for lighting objects to make a photographic image look "seen by eye" normal or surreal as a goal for the photograph is the available equipment. The viewer's reaction to an image(s) will be from the baseline of whether the lighting seems normal/natural or not compared to other clues. For example, when mixing natural artificial lighting, it is possible to control the differences between the shadow clues from the artificial light in coordination to the natural light. A photograph of a person's face artificially illuminated to appear as if it were photographed at noon will not seem normal if the background is illuminated by a setting sun because the lighting clues of the foreground do not match.

The sun hitting the front of objects facing a camera acts as "key" light creating highlights and casting shadows. The detail in the shadows is visible because the sunlight reflects off water vapor and dust in the atmosphere creating omni-directional "fill". In open shade three dimensional objects will also usually cast shadows because the downward vector of skylight is usually stronger than the sideways vectors illuminating the sides. When a photographer puts a light source behind an object its role in the lighting strategy is to define an outline and create an impression of physical separation and three dimensional space that a frontally illuminated scene lacks. To differentiate that role from that of "key" modeling when a modeling source moves behind the object it is typically called a "rim" or "accent" light. In portrait lighting it also called a "hair" light because it is used to create the appearance of physical separation between the subject's head and background. In natural lighting the tone of the background of an image is influenced by its reflective qualities and whether it is illuminated by the sun directly or skylight indirectly. Either the sun or sky, or a combination of both can be used for "background" lighting.

Artificial lighting strategies which seem most "natural" duplicate the same contrast pattern clues seen on three dimensional objects in various lighting conditions. A typical studio lighting configuration will consist of a fill source to control shadow tone, a single frontal key light to create the highlight modeling clues on the front of an object facing the camera over the shadows the fill illuminates, one or more rim/accent lights to create separation between foreground and background, and one or more background lights to control the tone of the background and separation between it and the foreground. This equipment may be cumbersome to store or transport.

There are two significant differences between natural lighting and artificial sources. One is the character of the fill and the other is more rapid fall-off in intensity. In nature skylight fill is omni-directional and usually brighter from above. That "wrap around" characteristic is difficult to duplicate with a directional artificial source. In a fixed studio location it is possible to bounce fill backwards off a white wall to flood the space with indirect reflected light to simulate the impression of the sun reflecting off the atmosphere. Another way is to supplement a fill source from the direction of the camera with reflectors placed near the sides of the foreground subject.

The inverse-square law describes the approximate way a light source radiates and changes in intensity with distance. As the distance from a source doubles the area of the footprint of light increase by a factor four (the square of the distance). Because the same number of photons are spread over four times the area when distance is doubled the intensity at any point will be or ¼ the strength. Photographic light sources are not point light sources so the inverse square law does not perfectly apply but it explains why distance of artificial sources affects the character of lighting and lighting strategies in ways not seen in nature.

According to the inverse-square law if the distance of a light source is changed in the following distance increments 1, 1.4, 2, 2.8, 4, 5.6, 8, 11, 16, 22, 32, 45, 64 the intensity will decrease by one f/stop. In practical terms this means if one face in a group portrait is 4 m from the "key" light and another is 5.6 m away the face further from the light will be one f/stop darker. In an outdoor portrait of a group of 200 people taken on an overcast day the lighting on all of the faces will be equal. The same group photographed indoors would be far more difficult to light evenly. The simplest strategy requiring the least lighting equipment would be to get above the group with the camera, have them look up and bounce the lighting off the ceiling so like an overcast day every face is as equidistant as possible to the apparent source of the light.

Even something as basic as a head and shoulders portrait must take inverse-square fall-off into account by posing the front of the subject's face as close or closer to the "key" light than the shoulder or any other body part if the goal is to make the front of the face the most strongly contrasting focal point on a darker background. The position of the fill source relative to the face will also affect whether the nose shadow is the lightest (when fill is centered near camera) darkest (when fill is placed to the side) one on the face. The distance of the key and fill sources to the face will affect the rate at which the shadows transition from light to dark on the face.

A scene may be lit to look natural or surreal. Natural and surreal just describe grossly the effect of lighting. Understanding what makes lighting seem natural makes it easier to understand how to create other desired reactions. Natural light usually comes from above, so strategies which place the key light below the face will appear to be unusual or unnatural. The brain adapts color perception in a way which makes color balance seem neutral on white clothing and faces. The eyes also adapt to brightness as they scan and usually perceive a full range of detail in most environments. Lighting a scene with a tonal range or color cast which is out of context with what would typically be expected will cause the viewer to notice the environment and make other than normal assumptions about it. It is also possible to create the impression of environmental context where none is seen in the photograph, such the look of a person standing under a streetlight at night by using a gridded flash attached to the ceiling of the studio with no fill source.

A reflector is an improvised or specialized reflective surface used to redirect light towards a given subject or scene. Reflectors are often fixed to an artificial light source (for example, a filament bulb or flash tube) to direct and shape the otherwise scattered light by reflecting the light off a concave inner surface and direct the light toward the scene to be photographed. Although there are a large number of variants, the most common types of reflectors are spherical, short-sided, giving a relatively broad spread of light, and parabolic, providing a tighter, parallel beam of light.

The reflector factor is the ratio of the illumination provided by a lamp fitted within a reflector to the illumination provided without any reflector fitted. A matte reflector will typically have a reflector factor of around 2, due to its more diffuse effect, while a polished or metallic-finished reflector may have a factor of up to 6.

A Soft box is a type of photographic lighting device, one of a number of photographic soft light devices. Soft light fixtures create even and diffused light by directing light through some diffusing material, or by "bouncing" light off a second surface to diffuse the light. Light from a bulb may be bounced off the inside of a metalized umbrella to create a soft indirect light in a known umbrella light.

A "soft box" is an enclosure around a bulb comprising reflective side and back walls and a diffusing material at the front of the light.

The sides and back of the box are lined with a bright surface—an aluminized fabric surface or an aluminum foil, to act as an efficient reflector. In some commercially available models the diffuser is removable to allow the light to be used alone as a floodlight or with an umbrella reflector.

A soft box can be used with either flash or continuous light sources such as fluorescent lamps or "hot lights" such as quartz halogen bulbs or tungsten bulbs. If soft box lights are used with "hot" light sources, the user must be sure the soft box is heat rated for the wattage of the light to which it is attached in order to avoid fire hazard.

Figure 9:
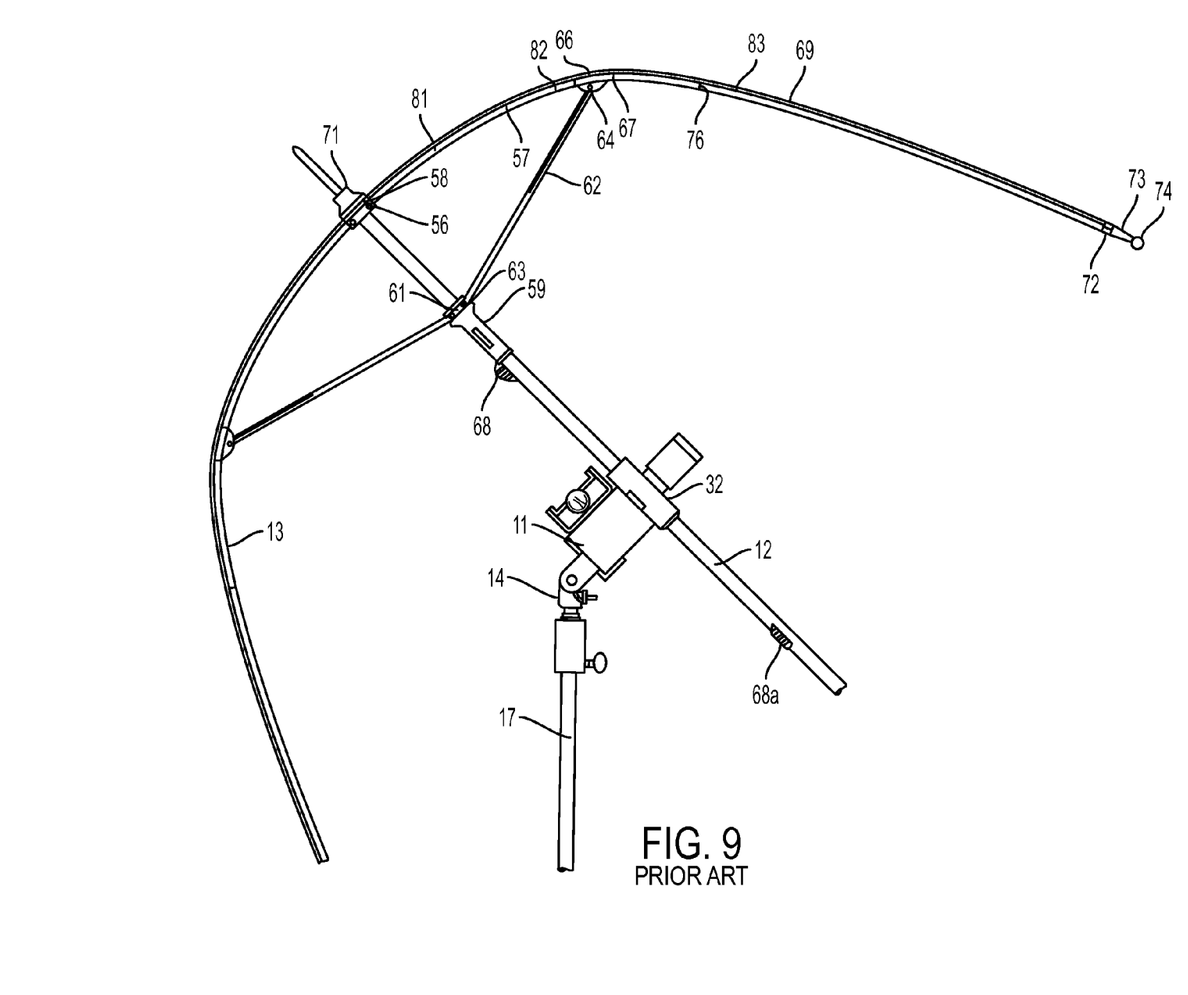
FIG. 9 shows a prior art fixture.

U.S. Pat. No. 3,851,164 entitled, "Umbrella Light," is expressly incorporated by reference herein and shows a prior art umbrella light fixture. As shown in FIG. 9, a light source 11 is adjustably fixed to the axial shaft 12 of a foldable umbrella-type reflector 13. The assemblage of umbrella-type reflector 13 and light source unit 11 is adjustably supported on a swivel 14 atop a conventional folding tripod stand having an adjustable telescoping vertical pole 17. The light source unit 11 has a pair of quartz halogen lamps.

The light source unit 11, has the lamps and reflectors in predetermined fixed relationship, is adapted to be secured at any suitable position along the length of the umbrella shaft 12. To this end it has spring clamp 32 for frictionally engaging the shaft 12. The bulbs and their reflectors are not arranged completely symmetrically with respect to the shaft 12 and the umbrella-type reflector carried thereby.

The spring clamp may be a simple conventional spring clip such as is used for holding sheets of paper together, having a pair of spring-loaded jaws generally several cm (e.g., about 5 cm) long and having a pair of finger pieces (e.g., Boston Bull Clip No. 2). One of the finger pieces is secured to the housing of the light source unit 11; the other, projects outwards for manual manipulation and is provided with a heat- and electrically-insulating covering.

The prior art device is configured with light source unit 11 fixed to the swivel 14 such that the center of gravity of the device is situated approximately directly over the pole 17 or base of the tripod. Like conventional umbrellas, the umbrella has, on its central shaft 12, a small ring 56 fixed near the top of the shaft; a set of long ribs 57 each having one end 58 pivotally attached to the small fixed ring 56; a slider 59 mounted on the shaft and having a small ring 61 integral therewith; a set of short ribs 62 each having one of its ends 63 pivotally attached to the slider ring and its other end 64 pivotally attached to the long rib at an intermediate point 66 on the length of said long rib 57 (a pivot fitting 67 being fixed to each long rib for this purpose); a latch 68 to hold the slider 59 in a position on the shaft in which the umbrella is open; a second latch 68a to hold the slider in a position on the shaft in which the umbrella is closed; and a fabric cover 69 which is fixed to the shaft just outside of the fixed ring 58 (being held on the shaft by a suitable ferrule 71) and is attached (as by suitable thread loops 72) to fittings 73 secured to the long ribs 57 adjacent their free ends 74, as well as by intermediate thread loops 76 engaging intermediate portions of said long ribs. As in conventional umbrellas, the covering is made up of series of substantially identical sectors or panels sewn together along their edges, forming seams, and the rib-attaching loops 72 are situated at the outer ends of the seams so that each of the panels is disposed between the corresponding adjacent long ribs. The position of the latch 68 is such that when the slider is held thereby the fabric is taut and the long ribs are bent. The ribs are flexible and of conventional construction, of thin metal which is formed into channel-shaped cross-section over substantially their whole length, except at their ends.

The umbrella is shaped so that in its open operative position it has a central portion, adjacent to its apex, whose fabric surface faces in a direction such as to reflect the light principally in an axial direction and a peripheral portion whose fabric surfaces face in a direction such as to reflect the light principally in a direction which is radial of the axis.

A significant disadvantage to the prior art configurations of umbrella lights as described above, that the weight of the light source unit and the required proximity of the light source unit 11 to the umbrella reflector limits the range of positions for the fixture which must always have a center of gravity above the base of the tripod. The relative position of the pole 17 and the fabric cover limit the orientation of the umbrella type reflector. In addition, the lighting unit, long ribs, short ribs, shaft and mounting pole all interfere with the light projection. The components, particularly the light source unit 11, contributes significant weight and the fixture is bulky, cumbersome to assemble, and requires significant storage space to store.

SUMMARY OF THE INVENTION

It is an object of the invention to provide a versatile fixture for photographic lighting.

The diversity of conditions and desired lighting effects for photography may require complex lighting strategies. It is a further object of the invention to provide a fixture that may be easily deployed and may be used, in varied situations for photographic lighting.

It is a further object of the invention to provide a fixture that may be adjusted to change the color, temperature, and intensity of the light created.

It is a further object of the invention to provide a lighting fixture that may be compactly stored and easily transported.

It is a further object of the invention to provide a lighting fixture that is not fragile.

It is a further object of the invention to provide a lighting fixture that reduces the amount of heat generated by a light source.

It is a further object of the invention to provide a lighting fixture that may have a reflector. It is a further object of the invention to provide a lighting fixture that may have a cover. The cover may be reflective or may be black. According to an advantageous feature, the cover may be provided to reduce light emissions in the area outside of the direction of interest. The cover may have a range of curvature when deployed.

It is a further object of the invention to provide a lighting fixture that does not require a reflector, yet is still able to effectively light an object for an exposure of at least f/1.4 at twelve feet on ISO 800 film.

One or more of the objects may be achieved by fixtures according to the invention. According to an advantageous feature of the invention a light fixture for photography may have light emitting diodes as its light source. Advantageously, the LED light sources may be arranged to cast light on a subject appearing to be uniform. It is an advantageous feature to provide a fixture that is collapsible and may be stored in a small space.

A fixture according to an embodiment of the invention, when assembled, may be shaped to direct light in a desired direction. The shape may be concave in the area of light emission. The light emitting portion or side of the fixture may be dish shaped. The light emitting portion of the fixture may be parabolic. The light emitting portion of the fixture may be in the general shape of a paraboloid. The shape may be paraboloidal. Description of shapes is not intended to require mathematical precision or symmetry. The scope of the invention includes a range of shapes from mathematical precision to shapes which are generally equivalent for purposes of theatrical or photographic lighting, for still or cinematographic applications. The exact shape is dependent on the characteristics of the spokes and load applied to the spokes. Light may be directed from an interior concave portion of the fixture. Advantageously the fixture may have a central hub with multiple spokes extending from the central hub. The spokes may be strips that carry a plurality of LEDs. The spokes may be pivot mounted to a central hub. Advantageously the fully assembled fixture may have the configuration of an umbrella. The LEDs may face the inside of the umbrella and toward a subject. The LEDs may be generally faced in the same direction. Advantageously the emission pattern of the LEDs may be generally normal to the mounting plane of an LED. The LEDs may have a half intensity angle of 60 degrees or less. A fixture having forward facing and emitting LEDs may not require a highly reflective backing.

Advantageously, the distal ends of the spokes may be held by a band and/or a shade/reflector. The band may carry LEDs also. When the band and/or shade or reflector are disassembled from the spokes, the spokes may pivot towards the outside of the umbrella and collapse into a configuration that may be easily stored in a generally tubular shape. The distal ends of the spokes, once released, may be reversely collapsible umbrella (as compared to a conventional umbrella).

A circumferential band may also carry LEDs, LED strips and/or LED packages. The LEDs may be set to be adjustable within a range of colors and temperatures. This can be accomplished by controlling individual LEDs having different colors and temperatures, or using LED elements which may be adjusted in color and/or temperature.

According to an aspect of the invention a light fixture may have a central hub base with three or more spokes hinged to the hub. The hinge may have an element to limit the range of rotation of the hinge at a position suitable for deployment and use. The spokes may rotate to be positioned where they are substantially parallel to the axis of the hub. This is the storage position where the fixture is folded to be compact and may be placed in an elongated bag or tube for storage and protection during transport. To set up the fixture for use, the spokes may be opened up by rotating them, for example, by approximately 90% so that they are aligned substantially perpendicular to an axis of the fixture. The fixture may have an arrangement to limit the rotation at that orientation. The spokes may then be flexed and held in a flexed alignment for use.

A plurality of LEDs may be distributed along the spokes so that LEDs define a generally concave shape or paraboloidal shape. A strap may be used to keep the spokes flexed. The LEDs may have a radiation pattern to emit light in a forward direction. This is useful when the fixture is pointing toward a photographic subject. The LEDs may be configured to emit sufficient radiation to effectively light an object for an exposure of at least f/1.4 at 12 feet on ISO 800 film. The LEDs may be mounted on an LED strip and an LED strip may be mounted on a spoke. The fixture may have LED packages mounted on the spokes. The spokes may be made with carbon fiber. The spokes and strap may be clipped or the strap may have pockets to receive the ends of the spokes. A slot and mating dog may be provided on the hinge and the hub to stabilize the spoke in relation to the hub. The fixture may have a back cover connected to the spokes in a deployed configuration. The cover may be reflective, have a high optical density, and/or be wind-permeable depending on the use. An LED controller may be provided to control the color, intensity, and/or temperature of the fixture light. The fixture may have a front cover which is a filter or diffuser. The front cover may also be clear.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Figure 1:
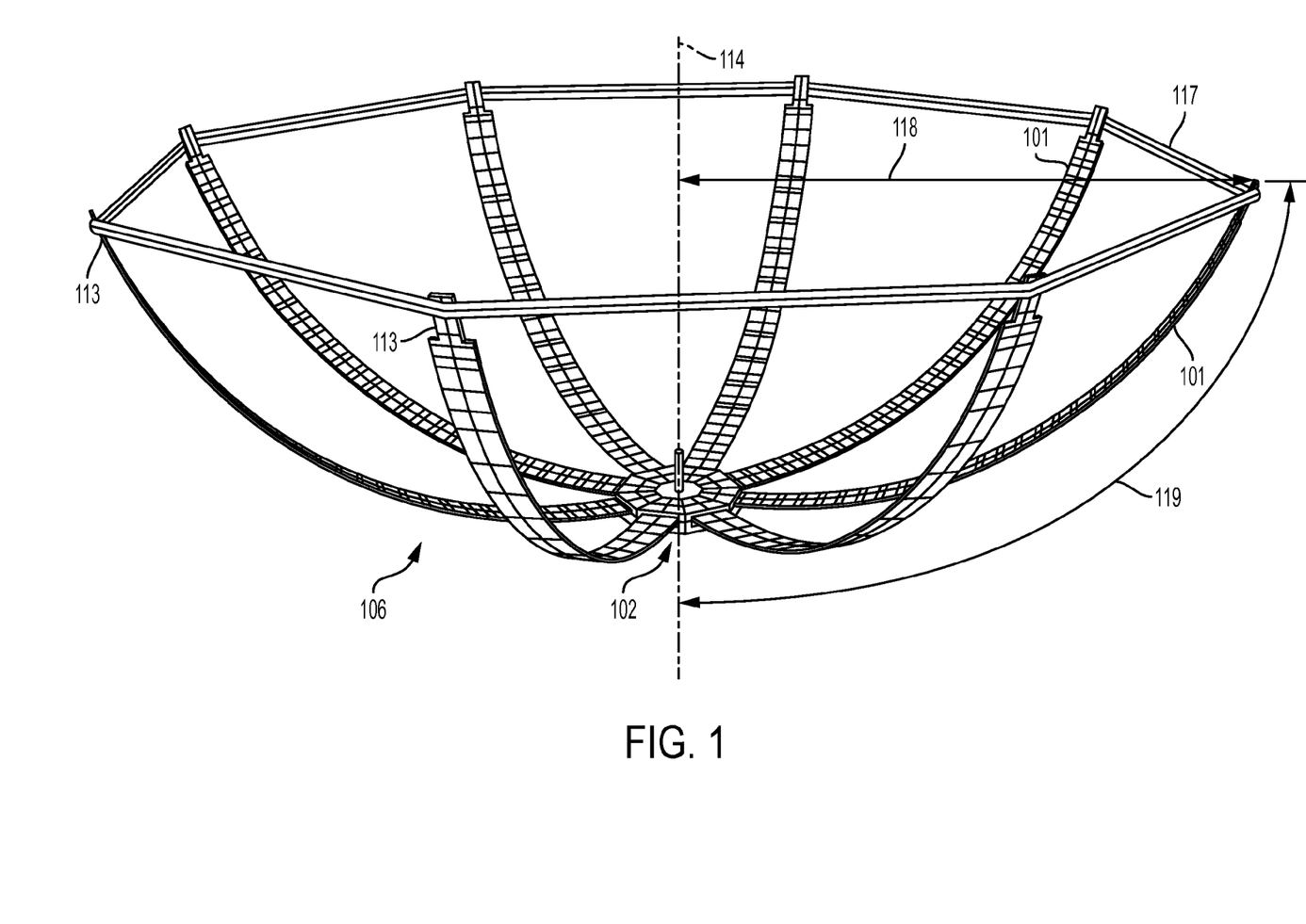
FIG. 1 shows an illustration of an embodiment of a fixture according to the invention.
Figure 2A:
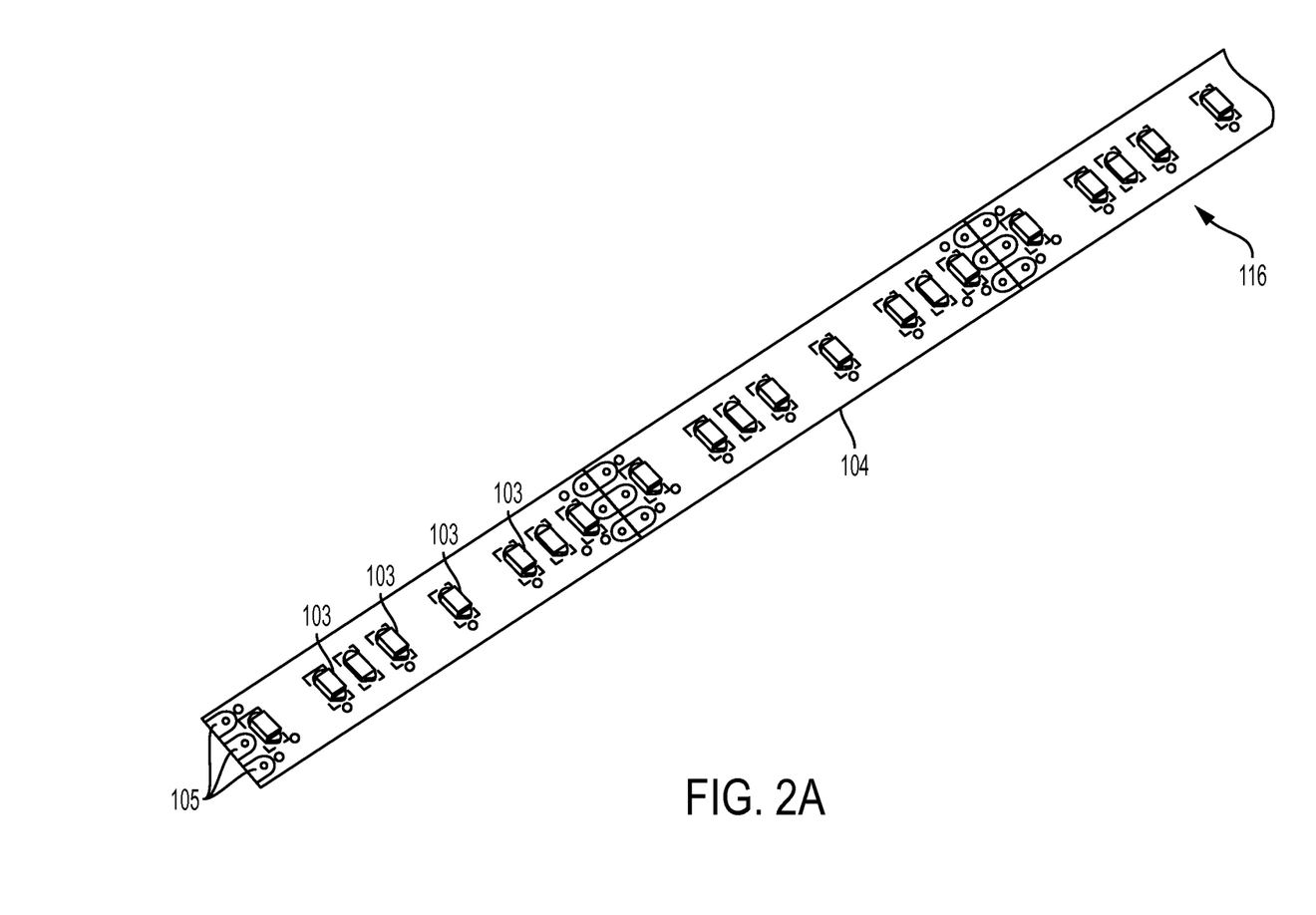
FIG. 2A shows an illustration of an embodiment of an LED strip that may be used according to an embodiment of the invention.

FIG. 1 shows an illustration of an embodiment of the invention. A fixture 100 is illustrated with a plurality of spokes 101 extending from a central hub 102. The spokes 101 may include a plurality of LEDs 103. The LEDs 103 may be carried by a substrate 104. The substrate 104 may be attached to the spokes or may itself be a spoke. The substrate 104 may have terminals 105 for application of electricity to the LEDs. The spokes 101 may be curved so as to define a concave configuration. The spokes 101 may direct light into and projecting from the concave configuration. The curvature of the concave configuration may be circular, parabolic or any other shape which provides the desired light projection and characteristics. Advantageously the position of the forward emitting LEDs 103 carried on spokes 101, may generally define an elliptical paraboloid. The shape is dictated by the characteristics of the spokes, and loading of the spokes. Advantageously the shape defined by the LEDs, intensity of the LEDs, number of LEDs and emission pattern of the LEDs are selected to cast sufficient light to illuminate an object or area for an exposure. Advantageously the spokes 101 may be flexible and resilient. A band or retainer 117 may be used to stabilize or flex the spokes 101 in a dish-like configuration. According to an embodiment the planar radius 118 of the rough circle defined by the band is smaller than the length of the rough arc 119 that starts at the central axis of the fixture and extends along the spoke 101 to a point where the circumferential band intersects the spoke 101. The circumferential band 117 may be a cord or webbing and may be adaptable for setting different lengths and different radius of curvature. One example, shown in FIG. 2, of LEDs mounted on a substrate, i.e. an LED strip 116, that may be used is an LED LITERIBBON VHO PRO SERIES sold by Litegear, Inc. (www.litegear.com/product/let-lightribbon/vho-pro-lightribbon-led/). According to one embodiment three LED strips 116 may be mounted on each spoke 101. Electricity may be supplied by conductors from a power supply or controller connected to one or more bus structures embedded in the hub. The strips or LEDs may be connected by leads to the bus structure.

According to an alternative, LEDs may be attached directly to or embedded in the spokes 101. The spokes 101 may be carbon fiber. Carbon fiber is selected for its high strength, flexibility, and light weight.

Figure 2B:
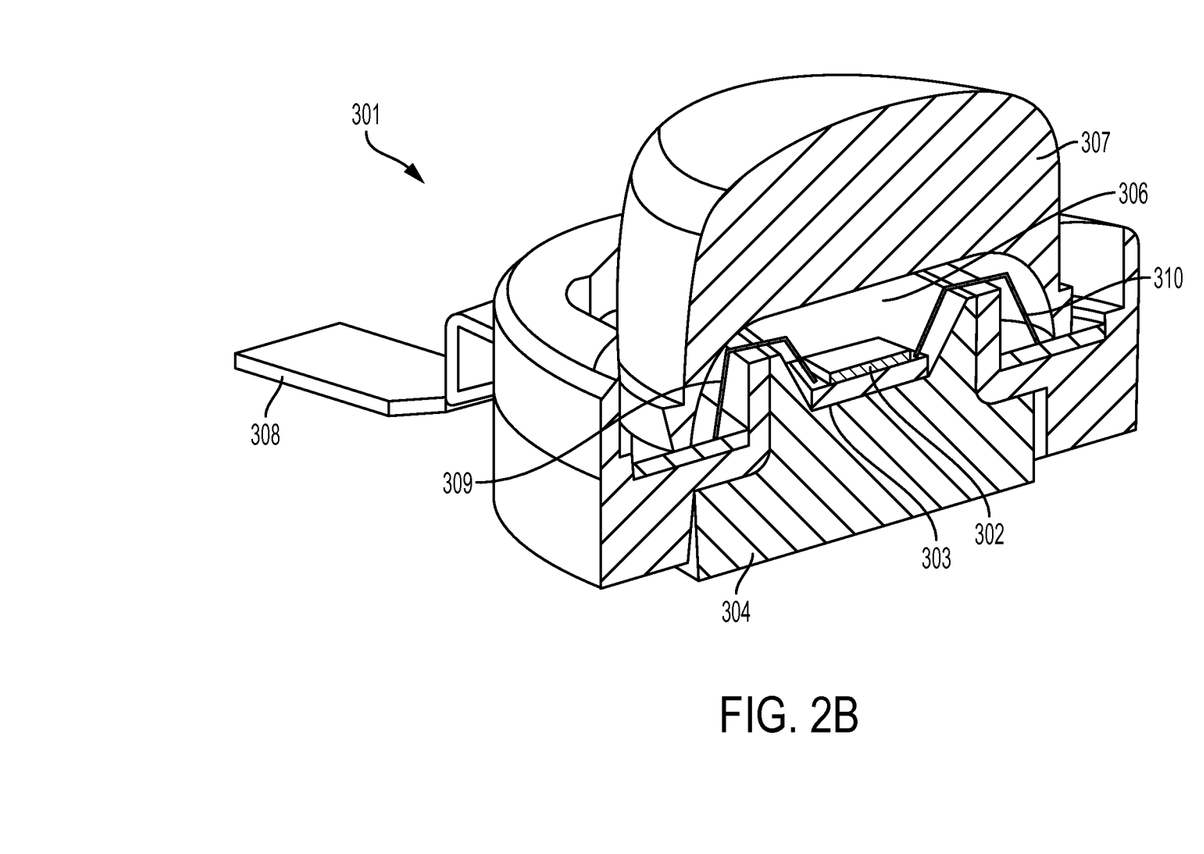
FIG. 2B shows an illustration of an LED package that may be used according to an embodiment of the invention.

LEDs may be in any useful configuration. An alternative to the configuration shown in FIG. 2A is a plurality of LED packages 301 of the type illustrated in FIG. 2B. A package may be constructed of an LED chip 302 on a submount 303 which in turn may be located on a heatsink 301. The LED and heatsink may be located within housing 305. The LED chip may be protected by an encapsulant 306. A lens 307 may be provided over the LED chip 302 and mounted on the housing 305. A first electrode 308 may be connected by a small wire 309 to the LED chip 302. For clarity the package is shown as a cutaway where the second electrode is not shown. The second electrode is attached to the LED chip by a wire 310. Other LED package configurations may be used.

Figure 3:
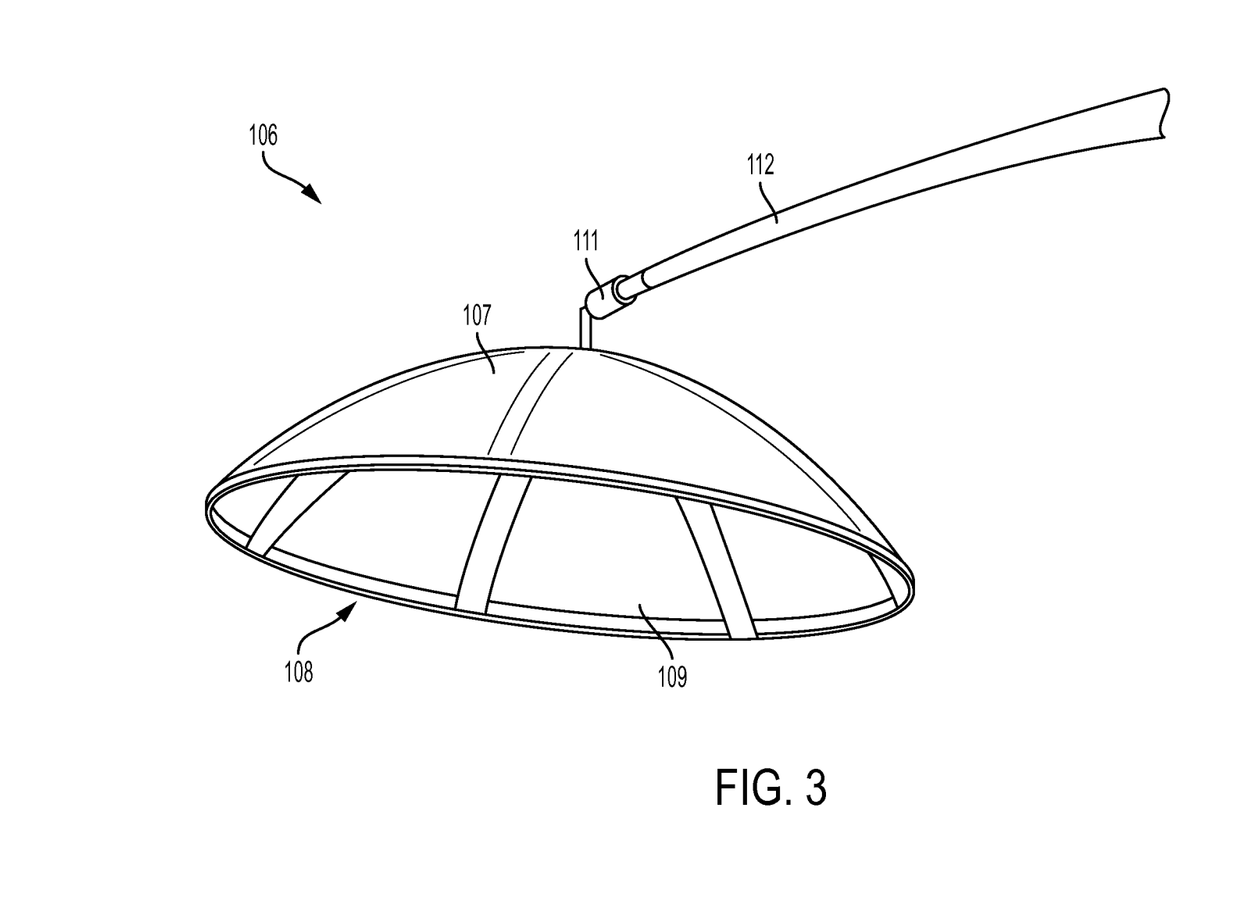
FIG. 3 shows an illustration of an embodiment of a fixture according to the invention.

FIG. 3 shows a fixture 106 with a cover 107. The cover 107 may be black. The cover may be reflective but, in most embodiments, need not be. The fixture 106 may be used with or without a cover 107. The cover 107 can be selected by the user based on color, light masking, absorbing, or reflective characteristics, and wind resistance in order to achieve a desired effect. The cover 107, when used, may have high optical density to block rearward visible light emissions from the fixture 106. In addition, the fixture 106 may be provided with a frontal closure (not shown) which may act as a diffuser or a filter. According to a preferred embodiment, the interior area 108 of the fixture 106 may be free of elements which would block some portion of the light. The LED elements 103 are mounted on or near the interior surface 109 of the concave fixture. According to and advantageous feature, the surface 110 of a central hub may provide additional surface area for mounting LEDs.

Figure 4:
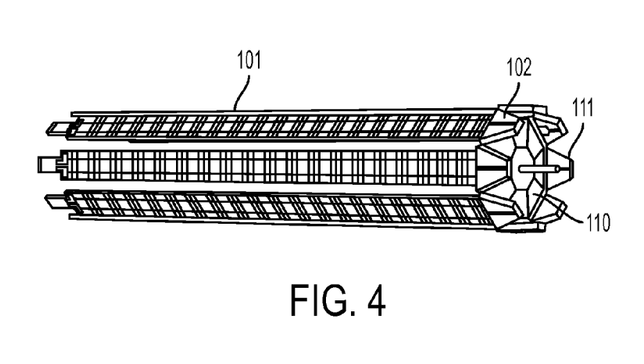
FIG. 4 shows an embodiment of a fixture in a storage configuration according to an embodiment of the invention.

FIG. 1 shows a fixture 106 with spokes 101 and hub 102 in an operational configuration. FIG. 4 shows the fixture 106 folded for storage with all of the spokes 101 positioned generally in the same alignment. The configuration shown in FIG. 4 is suitable for storage and transport and suitable inserting the fixture 106 into a storage sack or protective tube (not shown).

Figure 7:
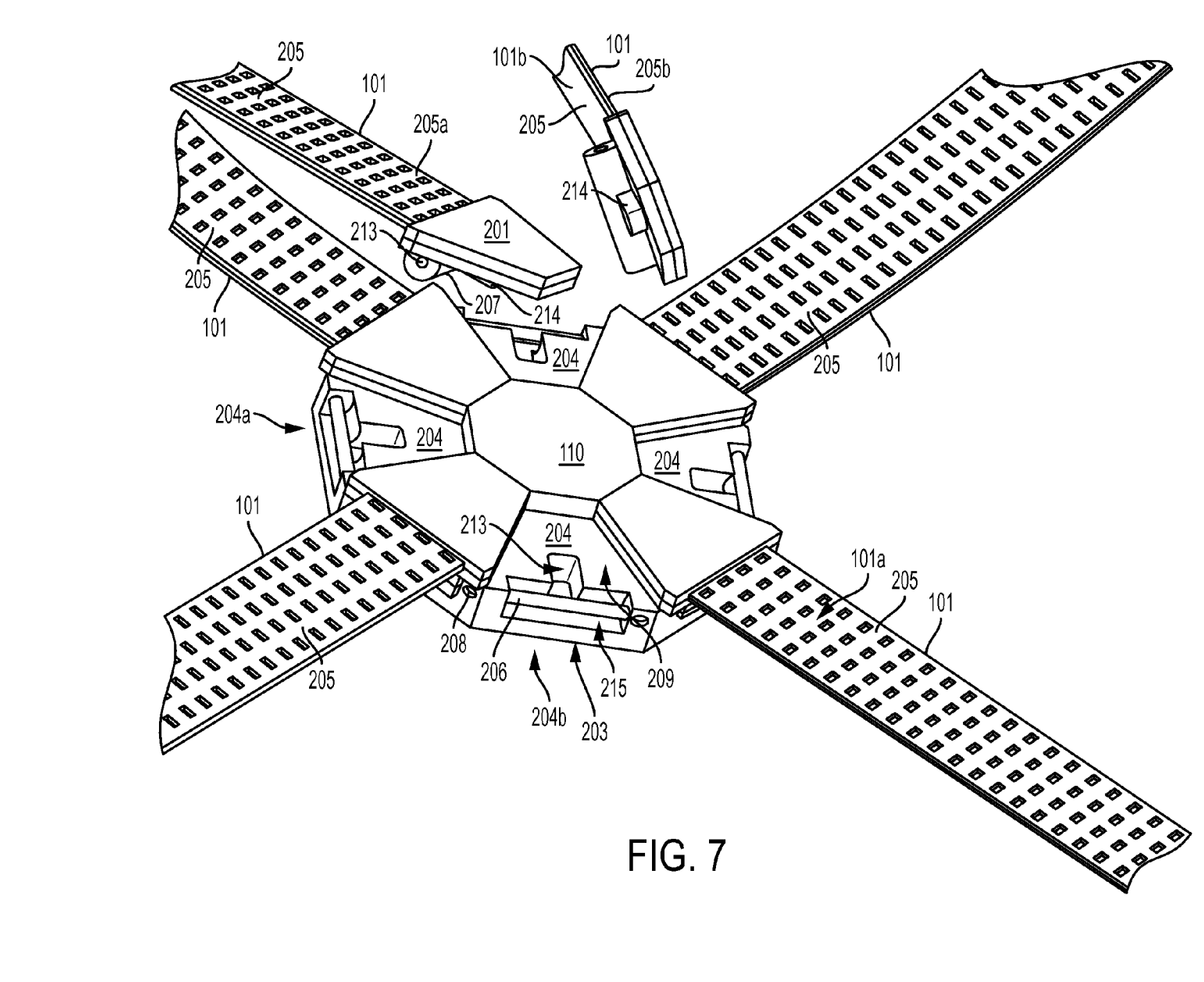
FIG. 7 shows a detailed illustration of a front view of a hub and spokes according to an embodiment of the invention.

In order to deploy the fixture 106, the spokes 101 may be rotated about a pivot 206 (shown in FIG. 7). An articulation mechanism may be configured to limit the rotation of the spokes 101.

Figure 5:
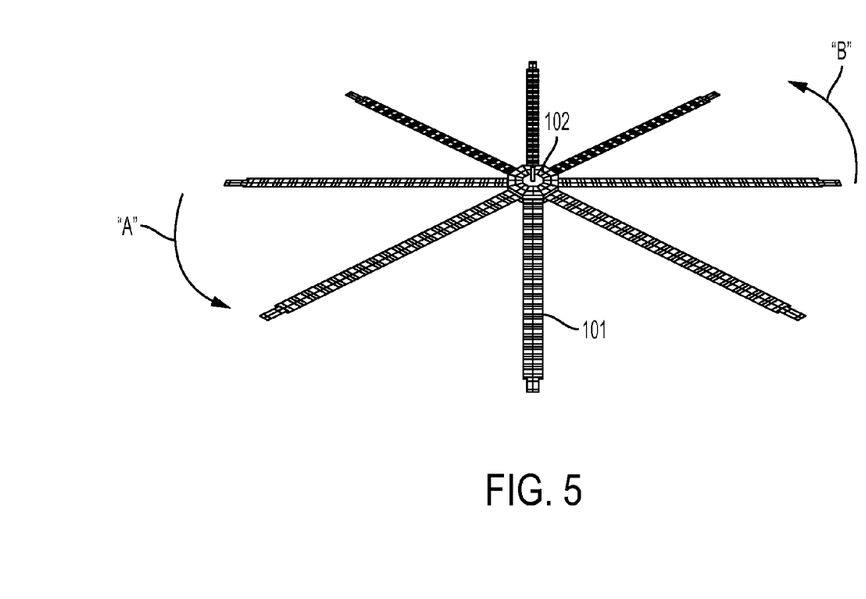
FIG. 5 shows an illustration of an embodiment of the invention in an open, but not fully deployed configuration.

The outwardly facing surface 101a, of the spokes 101 may carry the LED elements. FIG. 5 shows the spokes 101 in a fully extended position. The spokes 101 have been rotated outwardly until the articulation limiting elements engage. In order to return the spokes 101 to the storage configuration they may be rotated in direction "A" as shown in FIG. 5. In order to put the fixture 106 in a deployed configuration the spokes 101 may be deflected in direction "B" as shown in FIG. 5.

Figure 6:
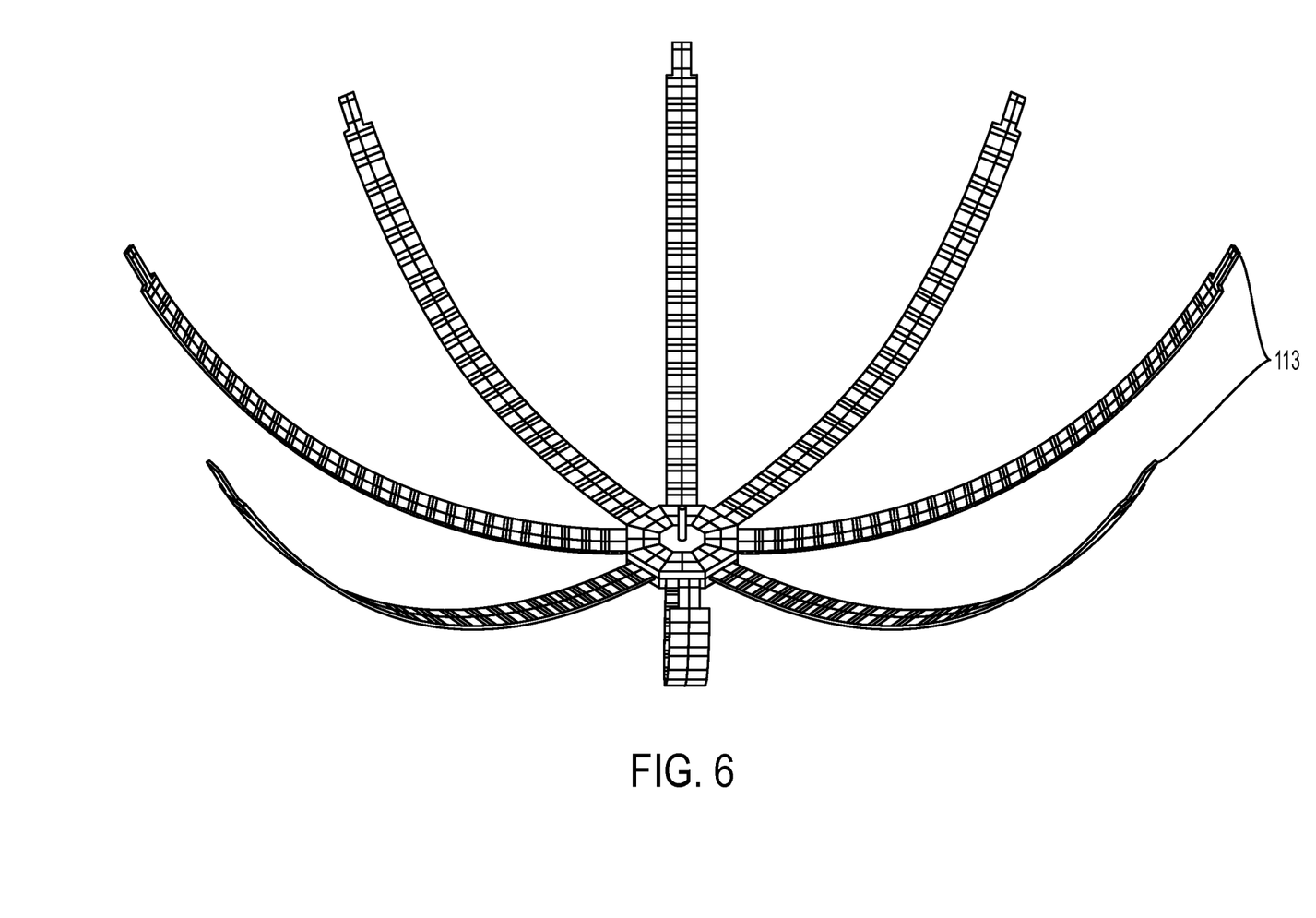
FIG. 6 shows an illustration of an embodiment of the invention with spokes in a deployed configuration.

FIG. 6 shows an embodiment with spokes 101 which have been articulated to a limit and in a deployed configuration deformed so that the distal end 113 of each spoke 101 is closer to a central axis 114 (indicated in FIG. 1) of the fixture 106 than the length of the spokes. For clarity, FIG. 6 is illustrated without a circumferential retainer 117. FIG. 1 shows a fixture with flexible resilient spokes 101. The distal end 113 of the spokes 101 may be held in position by a circumferential retainer 117. The spokes 101 may be flexed and the distal end 113 of each spoke 101 may be loaded by a circumferential retainer 117. A clip, buckle or other retaining mechanism may be used to engage the circumferential retainer 117 and the distal ends 113 of the spokes 101. The circumferential retainer 117 may be a strap. The circumferential retainer 117 may be integrated with a cover 107. The cover 107 may be configured to keep the distal ends 113 of the spoke 101 in the correct position without a separate strap.

The hub 102 may include a rear-facing portion 111 with a mount suitable for mounting the fixture 106 on a holder 112. The holder 112 may be in the form of a hand-held boom, a tripod or any other mechanism configured to hold the fixture in a desired location, position, or orientation.

The circumferential retainer 117 may be a band which itself is a carrier surface for mounted LEDs.

Utilization of many LEDs 103 mounted on the spokes 101 and/or band 117 allows the projection of light which illuminates a subject in a manner that appears to be uniform. The configuration according to the invention has the advantage of not having light-generating or other elements held in the interior area of the fixture which may interfere with light projected from LEDs 103.

FIG. 3 shows an embodiment of the invention. FIG. 3 shows a fixture 106 with spokes 101 connected to pivots which are mounted to or connected to a central hub 102. When the distal ends 113 of the spokes 101 are released, the spokes 101 may pivot back so as to collapse in the form of an inside out umbrella. This can be done with the cover 107 fully or partially removed or with a cover provided with a slit to allow circumferential expansion/deformation of the distal ends.

A slit in the cover 107 may be closed. The closure may be held in place by snaps, a zipper, a hook and loop element or other mechanism. FIG. 4 shows an embodiment of a fixture 106 in a collapsed configuration suitable for storage. The fixture 106 may be stored in a soft or rigid container. The container may be a generally cylindrical container sufficiently sized to accommodate the hub and spokes. According to an embodiment, the backing may be used to wrap around the collapsed fixture's spokes and secure them for storage.

Figure 8:
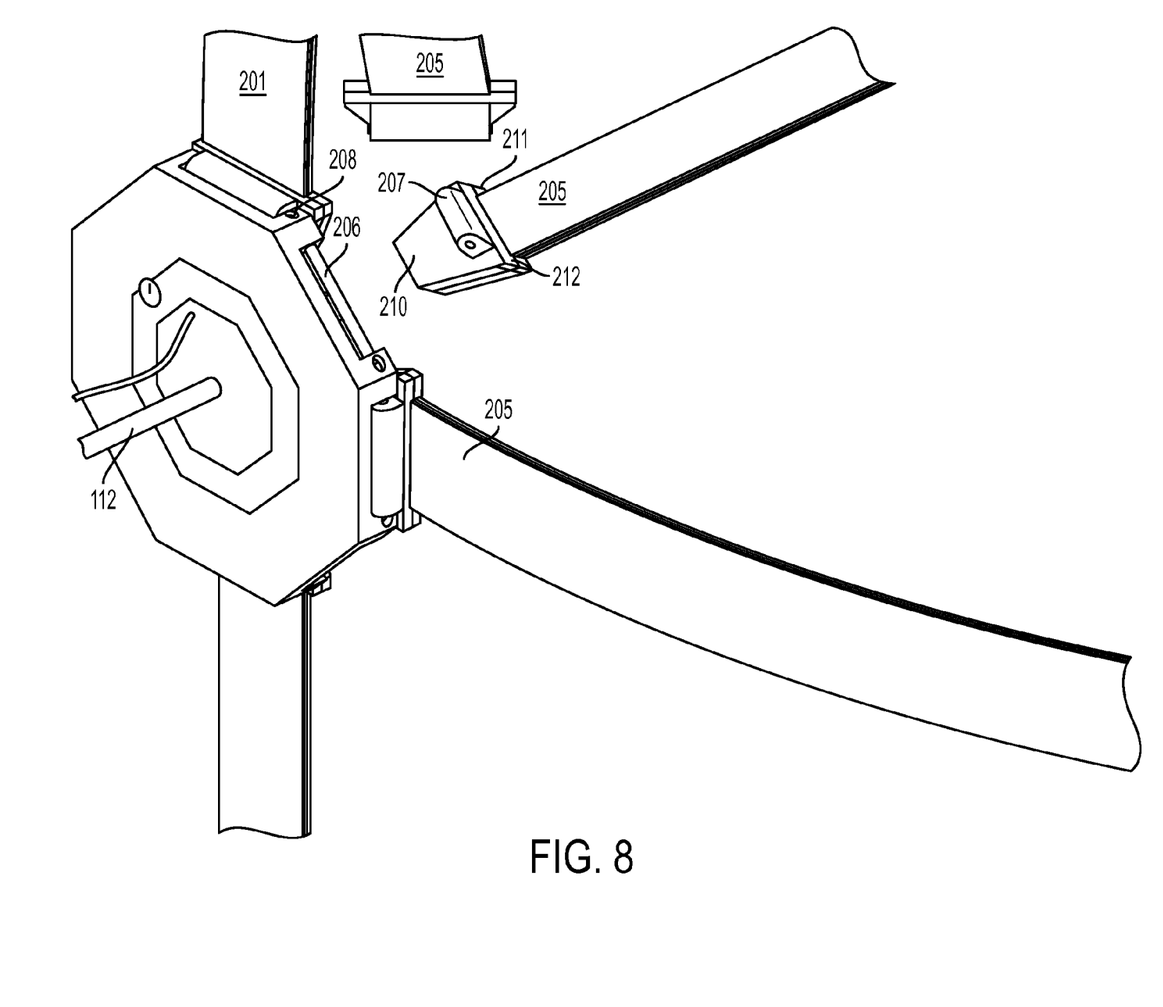
FIG. 8 shows a detailed illustration of back view of a hub and spokes according to an embodiment of the invention.

FIGS. 7 and 8 show an enlarged view of an embodiment of a hub 102 according to the invention. Several articulation elements 201 are omitted or detached for illustration purposes. The central hub 102 may include a support structure 203.

Support structure 203 may be the base of the central hub 102. The embodiment illustrated is suitable to carry spokes 101. A central hub 102 may be configured with a greater or lesser number of spokes. The number of spokes is related to the stability of the structure and the light generation. A mounting element 112 may be provided on the external or back side of the support structure 203 of the central hub 102. A mounting element 112 may be provided to facilitate attachment of the support structure 203 to a fixture mounting. Advantageously the mounting element may be connected to a tripod, boom, handle or a linkage to a holding device. Spoke assemblies 205 may be attached to support structure 203. The spoke assemblies 205 may include spokes 101 attached to articulation elements 201. For ease of illustration, spoke assemblies 205a and 205b are illustrated separately and not connected to support structure 203 in FIGS. 7 and 8. Each spoke assembly 205 is connected to the support structure 203 at a mounting station 204. For ease of illustration, no spoke assembly is shown in FIGS. 7 and 8 for mounting stations 204a and 204b. According to a preferred embodiment, 8-spoke assemblies 205 will be mounted each at a corresponding mounting station 204.

Each mounting station 204 of the support structure 203 may have pin 206. Each articulation element 201 may have a swivel bearing 207. When assembled, the pin 206 extends through a bearing hole 213 defined by the swivel bearing 207. For ease of assembly and fabrication, the swivel bearing may be a split bearing with a first portion carried by the limiting tab 210 and second portion mating with and fixed to the first portion of swivel bearing 207.

The support structure 203 may have a mounting recess 215. The mounting recess 215 is sized to accommodate the pin 206 and the swivel bearing 207. The pin 206 may be inserted through a pin insertion hole 208 into the bearing hole 213, extend through the swivel bearing 207. When assembled the ends of pin 206 may engage the support structure 203 at opposing sides of the mounting recess 215. The articulation element 201 may pivot around the pin 206 at each mounting station 204. The support structure 203 has an abutment surface 209 which may cooperate with the limiting tab 210 to limit the rotation of the articulation elements 201 of the spoke assemblies 205. The articulation elements 205 may be configured with the rotational limiting tab 210 extending beyond the swivel bearing 207. The articulation element 201 may pivot so that the rotational limiting tab 210 approaches the abutment surface 209. When the limiting tab 210 engages with the abutment surface 209, the rotation of the articulation element 201 may be limited.

The limiting tab 210 may be composed of an outer clamping element 211 joined to an inner clamping element 212. Advantageously the spoke 101 may be received and held in place between the outer clamping element 211 and the inner clamping element 212.

The mounting stations 204 may have a stabilizing recess 213. The articulation elements 201 may have a stabilizing boss 214 which engages the stabilizing recess 213 when the articulation elements 201 are rotated to their limits.

According to an advantageous feature of the invention, a controller may be connected to the LED bands in order to set the color, temperature and/or intensity of light generated by the LEDs.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for photographic lighting have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A light fixture for photography comprising:
   a central hub base;
   a plurality of spokes attached to said central hub base by a hinge;
   wherein said hinge includes a limit at an angular position corresponding to a deployed alignment of said spokes permitting said spokes to rotate from a storage position to a deployed position and wherein said storage position of said spokes is generally parallel to an axis of said hub and said deployed position is generally perpendicular to said axis of said hub;
   a plurality of LEDs distributed along said spokes; and
   wherein said LEDs define a generally concave shape when said spokes are in said deployed position and are positioned for said fixture to emit light from a concave opening side of said concave shape.

2. A light fixture according to claim 1 wherein said LEDs are arranged to emit light towards a subject.

3. A light fixture according to claim 2 wherein said LEDs are configured to emit sufficient radiation to effectively light an object for an exposure of at least f/1.4 at 12 feet on ISO 800 film.

4. A light fixture according to claim 1 wherein said LEDs are mounted on an LED strip and said LED strip is mounted on said spokes.

5. A lighting fixture according to claim 1 wherein said LEDs further comprise LED packages mounted on spokes.

6. A lighting fixture according to claim 1 further comprising a strap arranged at a position distal to said hub and arranged to contain said spokes in a deployed configuration.

7. A lighting fixture according to claim 6 wherein said spokes are flexible and said strap is configured to flex said spokes to define a concave shape in said deployed position against said limit.

8. A lighting fixture according to claim 6 wherein said strap further comprises pockets and said spokes are received in said pockets.

9. A light fixture according to claim 1 further comprising a slot defined on one of said hinge and said hub and a mating dog positioned to mate with said slot on the other side of said hinge and said hub wherein said slot and said dog are configured to stabilize said spoke in relation to said hub.

10. A light fixture according to claim 1 further comprising a mount located on said hub.

11. A light fixture according to claim 1 further comprising a back cover connected to said spokes in a deployed configuration.

12. A light fixture according to claim 11 wherein said cover is reflective.

13. A light fixture according to claim 11 wherein said cover is fabricated with a high optical density.

14. A light fixture according to claim 11 wherein said cover is wind-permeable.

15. A light fixture according to claim 1 further comprising an LED controller connected to said LEDs.

16. A light fixture according to claim 15 wherein said LED controller is an intensity controller.

17. A light fixture according to claim 15 wherein said controller is a hue controller.

18. A light fixture according to claim 15 wherein said controller is a light temperature controller.

19. A light fixture according to claim 1 wherein said LEDs are mounted and positioned to define a paraboloidal shape.

20. A light fixture for photography comprising:
   a central hub base;
   a plurality of spokes attached to said central hub base by a hinge;
   wherein said hinge includes a limit at an angular position corresponding to a deployed alignment of said spokes permitting said spokes to rotate from a storage position to a deployed position and wherein said storage position of said spokes is generally parallel to an axis of said hub and said deployed position is generally perpendicular to said axis of said hub;
   a backing carried by said spokes;
   a plurality of LEDs distributed on said fixture; and
   wherein said LEDs define a generally concave shape when said spokes are in said deployed position and are positioned for said fixture to emit light from a concave opening side of said concave shape.

* * * * *